(12) United States Patent
Ferrari et al.

(10) Patent No.: US 7,546,689 B2
(45) Date of Patent: Jun. 16, 2009

(54) JOINT FOR COORDINATE MEASUREMENT DEVICE

(75) Inventors: Paul Ferrari, Carlsbad, CA (US); Dongmei Hong, San Diego, CA (US)

(73) Assignee: Hexagon Metrology AB, Nacka Strand (SE)

( * ) Notice: Subject to any disclaimer, the term of this patent is extended or adjusted under 35 U.S.C. 154(b) by 76 days.

(21) Appl. No.: 11/775,081

(22) Filed: Jul. 9, 2007

(65) Prior Publication Data

US 2009/0013547 A1   Jan. 15, 2009

(51) Int. Cl.
  *G01B 5/008* (2006.01)
  *G01B 5/012* (2006.01)
(52) U.S. Cl. ............... 33/503; 33/1 N; 33/1 PT
(58) Field of Classification Search ........... 33/1 N, 33/1 PT, 503, 504, 706, 707, 708; 250/231.13, 250/231.18
  See application file for complete search history.

(56) References Cited

U.S. PATENT DOCUMENTS

| | | | |
|---|---|---|---|
| 4,676,002 A * | 6/1987 | Slocum .................. | 33/1 MP |
| 4,888,877 A * | 12/1989 | Enderle et al. ............ | 33/559 |
| 4,903,539 A * | 2/1990 | Toyoda et al. ............ | 74/490.01 |
| 5,084,981 A | 2/1992 | McMurtry et al. | |
| 5,088,337 A | 2/1992 | Bennett | |
| 5,148,377 A | 9/1992 | McDonald | |
| 5,187,874 A | 2/1993 | Takahashi et al. | |
| 5,189,797 A | 3/1993 | Granger | |
| 5,231,284 A * | 7/1993 | Mizutani et al. ....... | 250/231.13 |
| 5,396,712 A | 3/1995 | Herzog | |
| 5,408,754 A | 4/1995 | Raab | |
| 5,412,880 A | 5/1995 | Raab | |
| 5,505,003 A | 4/1996 | Evans et al. | |
| 5,510,977 A | 4/1996 | Raab | |
| 5,521,847 A | 5/1996 | Ostrowski et al. | |
| 5,528,505 A | 6/1996 | Granger et al. | |
| 5,611,147 A | 3/1997 | Raab | |
| 5,615,489 A | 4/1997 | Breyer et al. | |
| 5,757,499 A | 5/1998 | Eaton | |
| 5,768,792 A | 6/1998 | Raab | |
| 5,822,450 A | 10/1998 | Arakawa et al. | |
| 5,829,148 A * | 11/1998 | Eaton ..................... | 33/503 |
| 5,978,748 A | 11/1999 | Raab | |
| 5,991,704 A | 11/1999 | Rekar et al. | |
| 6,134,506 A | 10/2000 | Rosenberg et al. | |
| 6,161,079 A | 12/2000 | Zink et al. | |

(Continued)

FOREIGN PATENT DOCUMENTS

DE   4345091 A1   7/1995

(Continued)

*Primary Examiner*—R. Alexander Smith
(74) *Attorney, Agent, or Firm*—Knobbe, Martens, Olson & Bear, LLP

(57) ABSTRACT

An articulating joint for a coordinate measurement machine can include an improved optical encoder. The optical encoder can have an encoder hub and a read head that are rotatable with respect to each other based on movement of the articulating joint about an axis of rotation of the joint. The encoder hub has a read surface. The read surface can be an outer surface of a generally cylindrical segment. The read head can be positioned such that a read direction defined by the read surface is generally perpendicular to the axis of rotation of the articulating joint.

17 Claims, 5 Drawing Sheets

U.S. PATENT DOCUMENTS

| | | | |
|---|---|---|---|
| 6,219,928 B1 | 4/2001 | Raab et al. | |
| 6,366,831 B1 | 4/2002 | Raab | |
| 6,573,705 B1 * | 6/2003 | Tajima et al. | 324/174 |
| 6,598,306 B2 | 7/2003 | Eaton | |
| 6,606,539 B2 * | 8/2003 | Raab | 700/245 |
| 6,611,346 B2 | 8/2003 | Granger | |
| 6,611,617 B1 | 8/2003 | Crampton | |
| 6,618,496 B1 | 9/2003 | Tassakos et al. | |
| 6,668,466 B1 | 12/2003 | Bieg et al. | |
| 6,817,108 B2 | 11/2004 | Eaton | |
| 6,892,465 B2 | 5/2005 | Raab et al. | |
| 6,904,691 B2 | 6/2005 | Raab et al. | |
| 6,925,722 B2 | 8/2005 | Raab et al. | |
| 6,931,745 B2 | 8/2005 | Granger | |
| 6,935,036 B2 * | 8/2005 | Raab et al. | 33/503 |
| 6,952,882 B2 | 10/2005 | Raab et al. | |
| 6,984,236 B2 | 1/2006 | Raab | |
| 6,988,322 B2 | 1/2006 | Raab et al. | |
| 7,003,892 B2 | 2/2006 | Eaton et al. | |
| 7,017,275 B2 | 3/2006 | Raab et al. | |
| 7,043,847 B2 | 5/2006 | Raab et al. | |
| 7,051,450 B2 | 5/2006 | Raab et al. | |
| 7,073,271 B2 | 7/2006 | Raab et al. | |
| 7,152,456 B2 | 12/2006 | Eaton | |
| 7,174,651 B2 * | 2/2007 | Raab et al. | 33/503 |
| 7,246,030 B2 | 7/2007 | Raab et al. | |
| 7,269,910 B2 | 9/2007 | Raab et al. | |
| 7,290,344 B2 * | 11/2007 | Brandl et al. | 33/1 PT |
| 7,296,979 B2 | 11/2007 | Raab et al. | |
| 7,372,581 B2 | 5/2008 | Raab et al. | |
| 7,395,606 B2 * | 7/2008 | Crampton | 33/503 |
| 2002/0195551 A1 * | 12/2002 | Baxter et al. | 250/231.13 |
| 2004/0025357 A1 * | 2/2004 | Schroder | 33/1 PT |
| 2005/0116153 A1 * | 6/2005 | Hataguchi et al. | 250/231.13 |
| 2005/0229410 A1 * | 10/2005 | McMurtry et al. | 33/1 PT |
| 2007/0063500 A1 | 3/2007 | Eaton | |
| 2008/0066327 A1 * | 3/2008 | Mitterreiter | 33/1 PT |

FOREIGN PATENT DOCUMENTS

| | | |
|---|---|---|
| DE | 101 12 977 | 11/2002 |
| EP | 0522610 A1 | 1/1993 |
| FR | 2740546 | 4/1997 |
| GB | 2274526 A | 7/1994 |
| JP | 62226210 A * | 10/1987 |
| JP | 04-032393 | 2/1992 |
| JP | 404057690 | 2/1992 |
| JP | 05-031685 | 2/1993 |
| JP | 08295397 A * | 11/1996 |
| JP | 2003-021133 | 1/2003 |
| JP | 2003175484 | 6/2003 |
| JP | 2003275484 | 9/2003 |
| JP | 2006071615 A * | 3/2006 |
| JP | 2006-214559 | 8/2006 |
| WO | WO 98/08050 | 2/1998 |

* cited by examiner

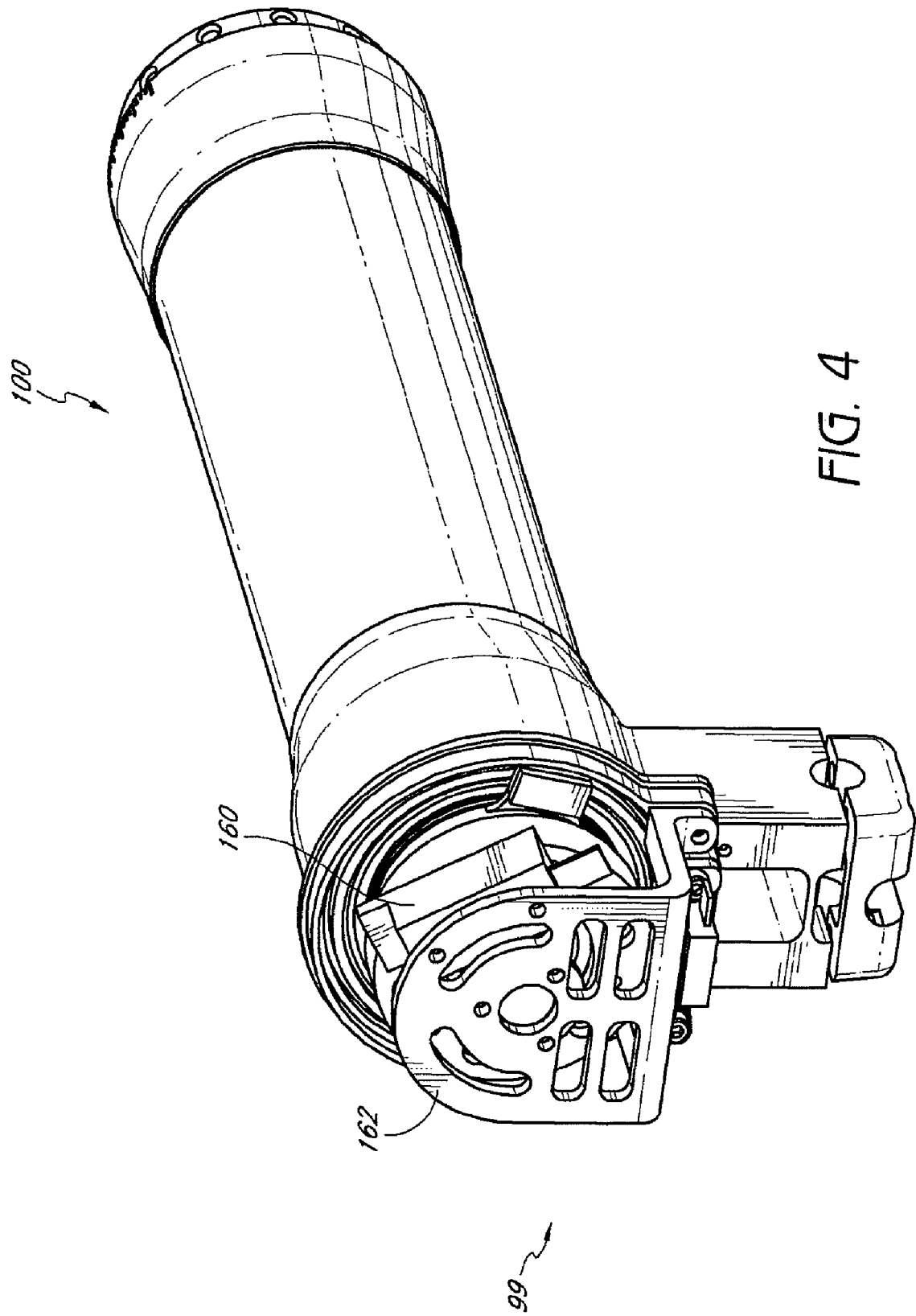

US 7,546,689 B2

JOINT FOR COORDINATE MEASUREMENT DEVICE

BACKGROUND OF THE INVENTION

1. Field of the Invention

The present application relates to measuring devices, and more particularly, to articulated arm coordinate measurement machines for measuring the coordinates of three-dimensional objects.

2. Description of the Related Art

Rectilinear measuring systems, also referred to as coordinate measuring machines (PCMM's) and articulated arm measuring machines, are used to generate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measurement sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by a user to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651.

As mentioned above, the purpose of PCMM's is to take highly accurate measurements. Accordingly, there is a continuing need to improve the accuracy of such devices.

SUMMARY OF THE INVENTION

In one embodiment, a coordinate measuring machine is disclosed. The coordinate measurement machine comprises a first transfer member, a second transfer member, and an articulating joint assembly. The articulating joint assembly rotatably couples the first transfer member to the second transfer member and defines an axis of rotation. The articulating joint comprises a housing, a shaft, and an encoder assembly. The shaft is rotatable relative to said housing. The encoder assembly comprises a read head coupled to one of said housing and said shaft; and an encoder hub attached to the other of said housing and said shaft, the encoder hub having a read surface. The encoder read head and the read surface of the encoder hub define a read direction of the encoder assembly. The read direction is transverse to the axis of rotation of the articulating joint.

In another embodiment, an optical encoder is disclosed. The optical encoder comprises a housing, a shaft, an encoder hub, and a read head. The shaft is rotationally coupled to the housing and defines an axis of rotation. The encoder hub is disposed on the shaft. The encoder hub defines a read surface. The read head is rotationally fixed with respect to the housing. A read direction defined by the position of the read head with respect to the read surface is transverse to the axis of rotation of the shaft.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following Figures.

FIG. 4 is a perspective view of the articulating member assembly of the coordinate measuring machine of FIG. 1 with a cover removed.

DETAILED DESCRIPTION OF THE PREFERRED EMBODIMENTS

Figure 1:
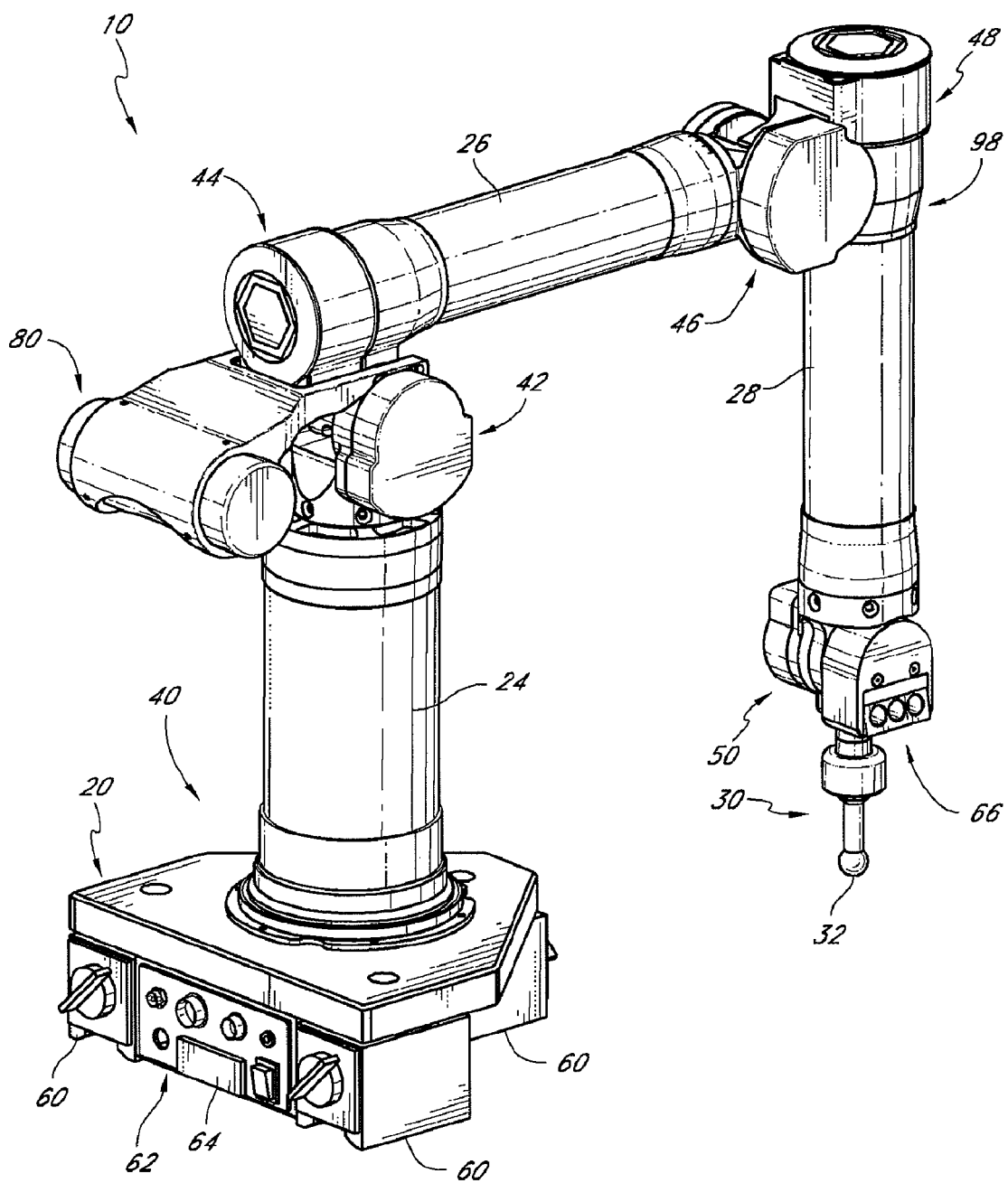
FIG. 1 is a perspective view of one embodiment of a coordinate measuring machine.

FIG. 1 illustrates one embodiment of a coordinate measuring machine (PCMM) 10. In the illustrated embodiment, the PCMM 10 comprises a base 20, a plurality of substantially rigid, transfer members 24, 26, and 28, a coordinate acquisition member 30, and a plurality of articulation members 40, 42, 44, 46, 48, 50 connecting the rigid transfer members 24, 26, 28 to one another. Each articulation member is configured to impart one or more rotational and/or angular degrees of freedom. The articulation members 40, 42, 44, 46, 48, and 50 allow the transfer members 24, 26, 28 of the PCMM 10 to be aligned in various spatial orientations thereby allowing fine positioning of a coordinate acquisition member 30 in three-dimensional space.

The position of the rigid transfer members 24, 26, 28 and the coordinate acquisition member 30 may be adjusted manually, or using, robotic, semi-robotic, and/or any other adjustment method. In one embodiment, the PCMM 10, through the various articulation members 40, 42, 44, 46, 48, 50, is provided with six rotary axes of movement. However, there is no strict limitation to the number or order of axes of movement that may be used, and, in other embodiments, a PCMM can have more or fewer axes of movement.

In the embodiment of PCMM 10 illustrated in FIG. 1, the articulation members 40, 42, 44, 46, 48, 50 can be divided into two functional groupings based on their operation, namely: 1) those articulation members 40, 44, and 48 which allow the swiveling motion associated with a specific transfer member (hereinafter, "swiveling joints"), and 2) those articulation members 42, 46, and 50 which allow a change in the relative angle formed between two adjacent members or between the coordinate acquisition member 30 and its adjacent member (hereinafter, "hinge joints"). While the illustrated embodiment includes three swiveling joints and three hinge joints positioned as to create six axes of movement it is contemplated that in other embodiments, the number of and location of hinge joints and swiveling joints can be varied to achieve different movement characteristics in a PCMM. For example, a substantially similar device with seven axes of movement could simply have an additional swivel joint between the coordinate acquisition member 30 and articulation member 50.

The coordinate acquisition member 30 can comprise a contact sensitive member or hard probe 32 configured to engage surfaces of a selected object and/or generate coordinate data on the basis of probe contact as is known in the art. Alternatively, the coordinate acquisition member 30 can comprise a remote scanning and detection component that does not necessarily require direct contact with the selected object to acquire geometry data. In one embodiment, a laser coordinate detection device (e.g., laser camera) can be used to obtain geometry data without direct object contact. It will be appreciated that in various embodiments of PCMMs, various coordinate acquisition member 30 configurations can be used including: a contact-sensitive probe, a remote-scanning probe, a laser-scanning probe, a probe that uses a strain gauge for contact detection, a probe that uses a pressure sensor for contact detection, a probe that used an infrared beam for positioning, and a probe configured to be electrostatically-responsive. Each of these can be used for the purposes of coordinate acquisition.

With continued reference to FIG. 1, in various embodiments of the PCMM 10, the various devices which may be used for coordinate acquisition, such as the probe 32, may be configured to be manually disconnected and reconnected from the PCMM 10 such that a user can change coordinate acquisition devices without specialized tools. Thus, a user can quickly and easily remove one coordinate acquisition device and replace it with another coordinate acquisition device. Such a connection may comprise any quick disconnect or manual disconnect device. This rapid connection capability of a coordinate acquisition device can be particularly advantageous in a PCMM 10 that can be used for a wide variety of measuring techniques (e.g. measurements requiring physical contact of the coordinate acquisition member with a surface followed by measurements requiring only optical contact of the coordinate acquisition member) in a relatively short period of time.

In the embodiment of FIG. 1, the coordinate acquisition member 30 also comprises buttons 66, which are configured to be accessible by a user. By pressing one or more of the buttons 66 singly, multiply, or in a preset sequence, the user can input various commands to the PCMM 10. In some embodiments the buttons 66 can be used to indicate that a coordinate reading is ready to be recorded. In other embodiments the buttons 66 can be used to indicate that the location being measured is a home position and that other positions should be measured relative to the home position. In other embodiments the buttons may be used to turn on or off the PCMM 10. In other embodiments, the buttons 66 can be programmable to meet a user's specific needs. The location of the buttons 66 on the coordinate acquisition member 30 can be advantageous in that a user need not access the base 20 or a computer in order to activate various functions of the PCMM 10 while using the coordinate acquisition member 30. This positioning may be particularly advantageous in embodiments of PCMM having transfer members 24, 26, or 28 that are particularly long, thus placing the base 20 out of reach for a user of the coordinate acquisition member 30. In some embodiments of the PCMM 10, any number of user input buttons (e.g., more or fewer than the three illustrated in FIG. 1), can be provided, which may be placed in various other positions on the coordinate acquisition member 30 or anywhere on the PCMM 10. Other embodiments of PCMM can include other user input devices positioned on the PCMM or the coordinate acquisition member 30, such as switches, rotary dials, or touch pads in place of, or in addition to user input buttons.

With continued reference to FIG. 1, in some embodiments, the base 20 further comprises magnetic attachment mounts 60 that can attach the base 20 to a metallic work surface. The magnetic attachment mounts 60 can desirably be selectively engaged so that a user can position the PCMM 10 on to a work surface then engage the magnetic attachment mounts 60 once the PCMM 10 has been placed in a desirable position. In other embodiment, the base 20 can be coupled to a work surface through a vacuum mount, bolts or other coupling devices. Additionally, in some embodiments, the base 20 can comprise various electrical interfaces such as plugs, sockets, or attachment ports 62. In some embodiments, attachment ports 62 can comprise connectability between the PCMM 10 and a USB interface for connection to a processor such as a general purpose computer, an AC power interface for connection with a power supply, or a video interface for connection to a monitor. In some embodiments, the PCMM 10 can be configured to have a wireless connection with an external processor or general purpose computer such as by a WiFi connection, Bluetooth connection, RF connection, infrared connection, or other wireless communications protocol. In some embodiments, the various electrical interfaces or attachment ports 62 can be specifically configured to meet the requirements of a specific PCMM 10.

With continued reference to FIG. 1, in some embodiments, the base 20 of the PCMM 10 can also include a self contained power source 64 such as a battery. Embodiments of PCMM 10 having a self contained power source can be easily moved to various locations that do not have easy access to a power source such as an AC power outlet, allowing enhanced flexibility in the operating environment of the PCMM 10. In one embodiment, the self-contained power source 64 can be a lithium-ion rechargeable battery that can provide power to the PCMM for periods of use away from a power outlet. In other embodiments, the self-contained power source 64 can be other types of rechargeable batteries such as nickel cadmium, nickel metal hydride, or lead acid batteries. In other embodiments, the self-contained power source 64 can be a single use battery such as an alkaline battery.

With continued reference to FIG. 1, the transfer members 24, 26, and 28 are preferably constructed of hollow generally cylindrical tubular members so as to provide substantial rigidity to the members 24, 26, and 28. The transfer members 24, 26, and 28 can be made of any suitable material which will provide a substantially rigid extension for the PCMM 10. As will be discussed in greater detail below, the transfer members 24, 26, and 28 preferably define a double tube assembly so as to provide additional rigidity to the transfer members 24, 26, and 28. Furthermore, it is contemplated that the transfer members 24, 26, and 28 in various other embodiments can be made of alternate shapes such as those comprising a triangular or octagonal cross-section.

In some embodiments, it can be desirable to use a composite material, such as a carbon fiber material, to construct at least a portion of the transfer members 24, 26, and 28. In some embodiments, other components of the PCMM 10 can also comprise composite materials such as carbon fiber materials. Constructing the transfer members 24, 26, 28 of composite such as carbon fiber can be particularly advantageous in that the carbon fiber can react less to thermal influences as compared to metallic materials such as steel or aluminum. Thus, coordinate measurement can be accurately and consistently performed at various temperatures. In other embodiments, the transfer members 24, 26, 28 can comprise metallic materials, or can comprise combinations of materials such as metallic materials, ceramics, thermoplastics, or composite materials. Also, as will be appreciated by one skilled in the art, many of the other components of the PCMM 10 can also be made of composites such as carbon fiber. Presently, as the manufacturing capabilities for composites are generally not as precise when compared to manufacturing capabilities for metals, generally the components of the PCMM 10 that require a greater degree of dimensional precision are generally made of a metals such as aluminum. It is foreseeable that as the manufacturing capabilities of composites improved that a greater number of components of the PCMM 10 can be also made of composites.

With continued reference to FIG. 1, some embodiments of the PCMM 10 may also comprise a counterbalance system 80 that can assist a user by mitigating the effects of the weight of the transfer members 26 and 28 and the articulating members 44, 46, 48, and 50. In some orientations, when the transfer members 26 and 28 are extended away from the base 20, the weight of the transfer members 26 and 28 can create difficulties for a user. Thus, a counterbalance system 80 can be particularly advantageous to reduce the amount of effort that a user needs to position the PCMM for convenient measuring. In some embodiments, the counterbalance system 80 can comprise resistance units (not shown) which are configured to ease the motion of the transfer members 26 and 28 without the need for heavy weights to cantilever the transfer members 26 and 28. It will be appreciated by one skilled in the art that in other embodiments simple cantilevered counterweights can be used in place or in combination with resistance units.

In the embodiment illustrated in FIG. 1, the resistance units are attached to the transfer member 26 to provide assisting resistance for motion of the transfer members 26 and 28. In some embodiments, the resistance units can comprise hydraulic resistance units which use fluid resistance to provide assistance for motion of the transfer members 26 and 28. In other embodiments the resistance units may comprise other resistance devices such as pneumatic resistance devices, or linear or rotary spring systems.

With continued reference to FIG. 1, the position of the probe 32 in space at a given instant can be calculated if the length of each transfer member 24, 26, and 28 and the specific position of each of the articulation members 40, 42, 44, 46, 48, and 50 are known. The position of each of the articulation members 40, 42, 44, 46, 48, and 50 can be measured as a singular rotational degree of motion using a dedicated rotational transducer, which will be described in more detail below. Each transducer can output a signal (e.g., an electrical signal), which can vary according to the movement of the 40, 42, 44, 46, 48, 50 in its degree of motion. The signal can be carried through wires or otherwise transmitted to the base 20 of the PCMM 10. From there, the signal can be processed and/or transferred to a computer for determining the position of the probe 32 in space.

In some embodiments of PCMM 10, a rotational transducer for each of the articulation members 40, 42, 44, 46, 48., and 50 can comprise an optical encoder. Various embodiments of optical encoder are discussed in more detail below with reference to FIGS. 3-6. In general, an optical encoder measures the rotational position of an axle by coupling its movement to a pair of internal hubs having successive transparent and opaque bands. In such embodiments, light can be shined through or reflected from the hubs onto optical sensors which feed a pair of electrical outputs. As the axle sweeps through an arc, the output of an analog optical encoder can be substantially two sinusoidal signals which are 90 degrees out of phase. Coarse positioning can be determined through monitoring a change in polarity of the two signals. Fine positioning can be determined by measuring an actual value of the two signals at a specific time. In certain embodiments, enhanced accuracy can be obtained by measuring the output precisely before it is corrupted by electronic noise. Thus, digitizing the position information before it is sent to the processor or computer can lead to enhanced measurement accuracy.

As will be described in detail below, in the illustrated embodiment, the articulation members 40, 42, 44, 46, 48, and 50 can be divided into two general categories, namely: 1) articulation members 40, 44, 48, which allow swiveling motion of a transfer member 24, 26, 28 and are thus sometimes referred to as "swivel members" 40, 44, 48 herein and 2) articulation members 42, 46 and 50, which allow for change in the relative angle formed between two adjacent members and are sometimes referred to herein as "pivot or hinge members" 42, 46, 50.

While several embodiment and related features of a PCMM 10 have been generally discussed herein, additional details and embodiments of PCMM 10 can be found in U.S. Pat. Nos. 5,829,148 and 7,174,651, and the entirety of these patents are hereby incorporated by reference herein. While certain features below are discussed with reference to the embodiments of PCMM 10 described above, it is contemplated that they can be applied in other embodiments of PCMM such as those described in U.S. Pat. Nos. 5,829,148 or 7,174,651, or some other pre-existing PCMM designs, or PCMM designs to be developed.

Figure 2:
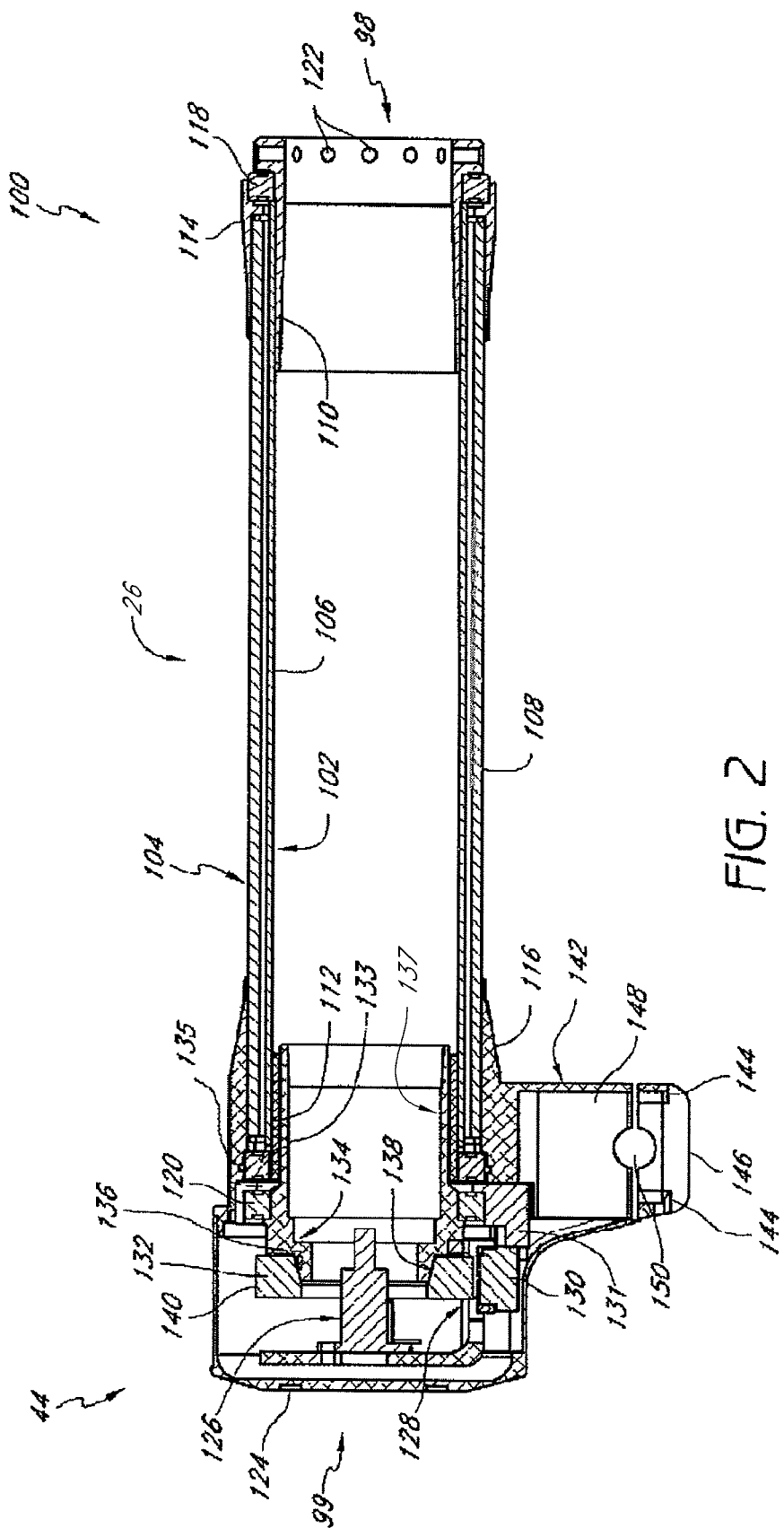
FIG. 2 is cross-sectional view of an articulating member assembly of the coordinate measuring machine of FIG. 1.

Referring now to FIG. 2, a cross-sectional view of a transfer member 26 and articulating member 44 is illustrated. While this view illustrates a single transfer member 28 in the PCMM 10, other transfer members 24, 28 of the PCMM 10 can have similar construction. The transfer member 26 preferably comprises a distal end 98 and a proximal end 99. As described herein, the terms distal and proximal are used to describe relative ends of the PCMM 10 and its associated components with the base 20 being the proximal end and probe 32 being the distal end (See FIG. 1). The terms distal and proximal are meant only to simplify description and are in no way intended to limit the scope of the technology described herein.

Beginning with the tubular assembly illustrated in FIG. 2, the transfer member 26 preferably comprises an inner shaft 102 and an outer housing 104. The inner shaft 102 is preferably configured to be rotated independently of the outer housing 104 so as to provide rotational freedom for the transfer member 26. The inner shaft 102 can desirably rotate on a first bearing 118 and also on, preferably, a compliant bearing 133 that are positioned at opposite ends of the inner shaft 102 and the outer housing 104. This configuration is particularly advantageous in that the bearings 118 and 133 are located relatively far apart so as to provide a very stable rotating interface between the inner shaft 102 and the outer housing 104. In the illustrated embodiment, the bearings 118, 133 are desirably press fit so as to provide a secure rotating interface between the inner shaft 102 and the outer housing 104. Furthermore, in some embodiments, it may be preferable to appropriately preload the bearings 118, 133 so that any unwanted axial movement of the inner shaft 102 relative to the outer housing 104 is minimized. In other embodiments, the bearings can be positioned at different locations to provide a rotating interface between the inner shaft 102 and the outer housing 104. In still other embodiments more or fewer than two bearings 118, 133 can provide a rotating interface between the inner shaft 102 and outer housing 104 of the transfer member 26. For example, a single bearing positioned on the proximal end can provide the rotating interface. In some embodiments, the second bearing 133 is a compliant bearing including an O-ring 135 extending therearound. In some embodiments, a bearing 120 of the encoder assembly 128 can be a compliant bearing, and the two bearings 118, 133 of the transfer member 26 can be rigid bearings. In some embodiments, bushings can be substituted for bearings.

As illustrated in FIGS. 1 and 2, both the inner shaft 102 and the outer housing 104 comprise generally cylindrical members. This generally cylindrical construction can be advantageous because it offers construction simplicity, rigidity, light weight, and space inside for a printed circuit board which will be discussed in greater detail below. Also, as shown in FIG. 2, the generally cylindrical shape allows concentric mounting of an inner shaft 102 having an outer diameter approaching the inner diameter of the outer housing 104, thereby increasing rigidity while maintaining low weight and a sleek profile. In some embodiments, the outer diameter of the inner shaft 102 is desirably at least 50%, and more preferably at least 75% of the inner diameter of the outer housing 104. In some embodiments the inner shaft 102 and outer housing 104 can comprise alternate shapes. For example, in some embodiments, the inner shaft 102 can comprise a solid shaft as opposed to a tubular member. Furthermore, in other embodiments the inner shaft and outer housing 104 can comprise substantially polygonal cross-sectional profiles such as an octagonal shape, a triangular shape, or a square shape.

With continued reference to FIG. 2, the inner shaft 102 can desirably comprise an inner tubular member 106 that comprises a first end cap 110 and a second end cap 112. Furthermore, the outer housing 104 can comprise an outer tubular member 108, a first end cap 114 and a second end cap 116. The assembly of the inner and outer tubular members 106, 108 can form the transfer member 26. The transfer member 26 thus formed can provides a substantially rigid structure defining a reach distance for the PCMM 10.

In some embodiments, the end caps 110, 112, 114, 116 can provide precision machined bearing surfaces for the bearings 118 and 133. Further, the end caps 110, 112, 114, 116 can provide precision concentricity to the articulating member 44. In some embodiments, it is preferable that the end-caps 110, 112, 114, 116 are bonded to the tubular members 106 and 108 in such a way that the resulting inner shaft 102 and outer housing 104 are precisely and accurately balanced. One method of assuring this balance involves allowing an adhesive agent such as a glue or epoxy to cure while the bonded assembly is being rotated. Other suitable securing methods may be used to secure the end caps 110, 112, 114, and 116 to the tubular members 106 and 108. In some embodiments of PCMM, such suitable securing methods can also comprise mechanical fastening means such as a threaded interface, a plurality of screws or bolts, press fit (such as interference fit), thermal fit, tapered fit, or any combinations thereof.

In some embodiments, when the end caps 110, 112, 114, and 116 are bonded to the tubular members 106 in 108 using an adhesive agent such as a glue or epoxy, portions of the interior surface of the inner tubular member 106 and the outer tubular member 108 may be scored, wire brushed, or otherwise grooved to provide a more positive bonding surface for the adhesive agent. Likewise, corresponding surfaces of the end-caps 110, 112, 114, and 116 may be scored in place of or in addition to tubular member scoring.

In some embodiments, it can be desirable that the end caps 110, 112, 114, 116 comprise a different material than the inner and outer tubular members 106, 108. Thus, in some embodiments, precision machined metallic end caps can be used together with carbon fiber tubular members 106, 108. In these embodiments, the metallic end caps 110, 112, 114, 116 can provide precision bearing mounting surfaces while the carbon fiber tubular members 106, 108 can achieve beneficial thermal growth properties. In other embodiments it may be preferable to construct the entire inner shaft 102 and the outer housing 104 of a single material, such as carbon fiber.

In the embodiment illustrated in FIG. 2, the first end cap 110 of the inner shaft 102, comprises mounting holes 122 positioned radially around the end cap 110. The mounting holes 122 can be used to attach another articulating member, such as the articulating member 46 to the transfer member 26. The mounting holes 122 can also be used to attach an extending member to the articulating member 26 so as to provide additional range of movement or reach to the PCMM 10. For example, in one embodiment, a pair of transfer members 28 can be coupled to each other to extend the reach of the device. The illustrated arrangement of the mounting holes 122 is particularly advantageous in that a relatively large number of fasteners can be used to secure an additional articulating member or an additional extension number thus providing a substantially secure and concentric attachment.

Figure 3:
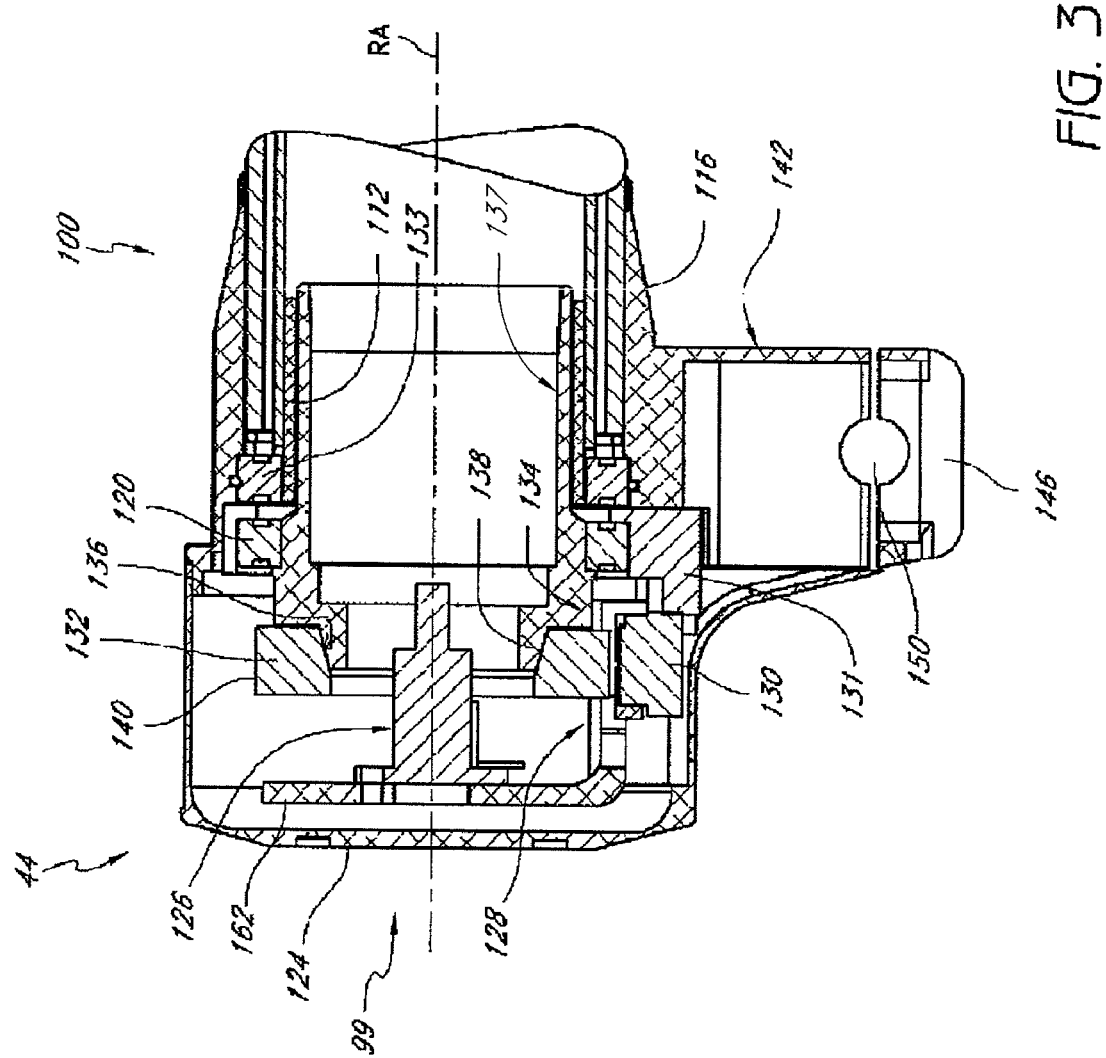
FIG. 3 is an enlarged cross-sectional view of the articulating member assembly of the coordinate measuring machine of FIG. 1.

FIG. 3 illustrates a detail view of the articulating member 44 of FIG. 2. With reference to FIG. 3, a cover piece 124 can be coupled to the second end cap 116 of the outer housing 104. The cover piece 124 can extend proximally so as to accommodate internal components of the articulating member 44 which reside towards a proximal end of the articulating member 44. In the illustrated embodiment, a slip ring assembly 126 and an encoder assembly 128 are housed within the cover 124. The slip ring assembly 126, in some embodiments, can be substantially similar to the slip ring assembly described in U.S. Pat. No. 5,829,148 issued on Nov. 3, 1998. In other embodiments, different slip ring assemblies can be housed with the encoder assembly 128. In still other embodiments, no slip ring assembly 126 is present. Embodiments of the encoder assembly 128 will be described in detail below.

With continued reference to FIG. 3, in the illustrated embodiment, the encoder assembly 128 comprises a read head 130, an encoder hub 132, a housing 131, encoder shaft 137 and a bearing 120 mounted between the housing 131 and encoder shaft 133. In some embodiments, the bearing 120 can be a compliant bearing. In these embodiments, both bearings 118, 133 of the transfer member 28 can be rigid. The encoder hub 132 can be mounted on the encoder shaft 137, which, in turn, can be inserted into the second end cap 112 of the inner shaft 102. A hub mounting portion 134 extends proximally from the encoder hub 132. The hub mounting portion 134 can comprise a tapered portion over which the encoder hub 132 can mount. In the illustrated embodiment, the encoder hub 132 preferably comprises a tapered recess 138 which closely matches a tapered portion 136 of the hub mounting portion 134. In some embodiments, this matched tapered fit can rotationally fix the encoder hub 132 to the encoder shaft 137. In other embodiments, it is desirable that the encoder hub 132 is further and/or alternatively attached to the hub mounting portion 134 with fasteners or an adhesive agent in addition to the tapered fit. The taper mounted design advantageously allows for the eccentricity between the hub and the axis to be minimized during mounting of the encoder hub 132 to the encoder shaft 137. However, in other embodiments, the encoder hub 132 could be mounted directly to the encoder shaft 137 using bolts, adhesive, press fit or temperature fit with or without a taper interface. While in the illustrated embodiment, the encoder hub 132 is rotationally fixed to encoder shaft 137, in other embodiments, the encoder hub 132 can be directly mounted to the inner shaft 102, the end cap 112 and/or another intermediate member.

In some embodiments, it is preferable that the encoder assembly 128 can be a light emitting diode (LED) encoder design. A reflective LED encoder design can provide particular advantages in that the light is reflected back to the read head 130 instead of being passed through gratings of the encoder hub 132. This reflective arrangement simplifies the encoder assembly 128 so as to not require an additional light source to pass light through optical demarcations or grating of the encoder hub 132. In other embodiments, a laser light source can be used. In other embodiments, the encoder can be a magnetic encoder rather than an optical encoder, and the encoder hub can include a magnetic pattern disposed thereon. In some embodiments of the encoder assembly 128 the encoder hub 132 is a RESR Taper Mounted Encoder hub as produced by Renishaw of the UK. Furthermore, in some embodiments the read head 130 is a type RGH35 also produced by Renishaw of the UK. These aforementioned devices are strictly examples of a read head and an encoder hub that can be used with one embodiment of the PCMM 10. In other embodiments, any suitable read head 130 or encoder hub 132 can also be used.

With continued reference to FIG. 3, in the illustrated embodiment, the read head 130 and the encoder hub 132 are arranged such that a read surface 140 of the encoder hub 132 is on a radially outer surface of the encoder hub 132 and the read head 132 is positioned radially outwards of the read surface 140. In some embodiments, the read head 130 can be attached to a bracket 162, which secures the read head 130 in a relatively stable position relative to the encoder hub 132. In some embodiments, the bracket 162 may be also used to secure the slip ring assembly 126 and/or a printed circuit board which will be discussed in greater detail below. In other embodiments, the read head 130, slip ring assembly 126, and printed circuit board can each be retained by separate brackets, or can be retained by mounting features formed in the surface of the cover 124.

In a preferred embodiment of the encoder, a read direction of the encoder assembly 128 is substantially perpendicular to the rotation axis RA of the articulating member, and the optical demarcations or gratings on the read surface are parallel to the rotation axis RA of the encoder assembly. This orientation of read direction is in opposition of a "disc style encoder" in which the read direction is parallel to a rotation axis RA of the encoder assembly 128 and gratings are arranged perpendicular relative to the rotation axis RA of the encoder assembly 128. As noted below, in other embodiments, other read head and read surface arrangements can be made. In the illustrated embodiment, optical demarcations or gratings on the read surface 140 are preferably parallel to a rotation axis RA of the encoder assembly 128. In some embodiments, the demarcations can be placed directly on the shaft 137, eliminating the need for a separate hub or disk. In some embodiments, the optical demarcations are not substantially parallel to the rotation axis RA (e.g., the optical demarcations could be transverse to the RA). In some embodiments, a read direction of the encoder assembly 128 is transverse to the rotation axis RA of the articulating member 44. In the illustrated embodiment, the read direction of the encoder assembly 128 is substantially perpendicular to the rotation axis RA of the articulating member. It is contemplated that still other embodiments of encoder assembly can include various combinations of read direction configuration and optical demarcation orientation. For example, it is contemplated that some embodiments, an encoder can have a read direction that is transverse to the rotation axis RA and optical demarcations that are not substantially parallel to the rotation axis RA (e.g., the optical demarcations could be transverse to the RA).

The preferred configuration of read direction described above can be particularly advantageous in that the circumference that the demarcations are placed on is greater than it would be for a disc style encoder of the same diameter. This increased circumference can yield a larger number of demarcations per revolution, thus increasing the resolution of the axis. This fine resolution is achieved in part because the read surface 148 is placed on a radially outer surface of the encoder hub 132, thus providing a relatively large readable surface area on the encoder hub 132. Thus, in some embodiments of optical encoder assembly 128 having optical demarcations on the read surface 140 of the encoder hub 132, there are a greater number of optical demarcations. This fine resolution is particularly advantageous in a PCMM 10 because the greater the resolution that can be achieved by the encoder assembly 128, the greater the accuracy of the measurement that can be achieved by the PCMM 10.

In a "disc style encoder", the read head and the encoder disc are arranged in a direction such that they can be detrimentally affected by thermal expansion. In these disc-style encoders, the inner shaft 102 and the bracket 162 could change in dimensions by differing amounts under certain conditions in response to temperature variations, causing the read head to move closer to or further away from the grating. This thermal response by the disc-style encoder could greatly affect the accuracy of readings by the encoder under certain thermal conditions. However, in the embodiments of encoder assembly 128 described above, the read surface 140 and read head 130 are positioned such that the read direction is perpendicular to the rotation axis RA. Thus, the change in encoder signal due to temperature variations is greatly reduced. This improved thermal response can in part be attributed to the fact that if thermal expansion does take place it is less likely to affect the distance between the read head 130 in the encoder hub 132 because the read head 130 and the encoder hub 132 are located on surfaces which are generally thermally similar. Furthermore, if thermal expansion were to take place, it is likely that the encoder hub 132 would simply displace laterally relative to the read head 130, thus minimally affecting the accuracy of the encoder assembly 128 as compared to thermal expansion which may influence the distance between the read head 130 and the encoder hub 132.

While a particular configuration of read head 130 and encoder hub 132 is illustrated, other embodiments are contemplated. In one embodiment, the encoder hub 132 can be externally mounted with respect to the housing 124. This external mounting arrangement allows for easy setup and alignment of the encoder hub 132 to the hub mounting portion 134. In another embodiment both the encoder hub 132 and read head 130 can be located outside of the cover 124 for easy alignment of the read head 130 to the encoder hub 132. In yet another embodiment, the encoder hub 132 may be surrounded by a portion of the cover 124, but the read head 130 is external to the cover 124. In yet another embodiment both the read head 130 and the encoder hub 132 are internal to the cover 124.

In various other embodiments, it can be desirable to use an encoder assembly 128 which comprises multiple read heads 130. For example, in some embodiments, the encoder assembly 128 may comprise three read heads 130 positioned at approximately 120° intervals around the encoder hub 132 such that the read heads 130 read the read surface 140 at multiple locations. This arrangement of read heads 130 may be particularly advantageous if any eccentricity is present in the encoder hub 132 as the multiple read heads 130 can cross check one another and reduce any inaccuracy produced by eccentricity of the encoder hub 132. Furthermore, it is also contemplated that in one embodiment of the encoder assembly 128, multiple read heads 130 can be included while data may be collected from only one read head 130 at any given time. In various embodiments, any number of read heads 130 can be used with the most common being 1, 2, 3, or 4.

With continued reference to FIG. 3, the second end cap 116 of the outer housing 104 preferably is also attached to a mounting clamp 142 that provides a mounting location for the articulating member 44 to mount to another articulating member assembly. The mounting clamp 142 can comprise a mounting base 148, which, in some embodiments, can be integrally formed with the end cap 116. The mounting base 148 preferably extends from the articulating member 44 and is attached to a face plate 146 by fasteners 144. The face plate 146 and the mounting base 148 can define a mounting hole 150 which is configured to attach to an axle of another articulating member assembly as described in greater detail below.

With reference to FIG. 4, a proximal end of the articulating member 44 is illustrated with the cover 124 removed for clarity. In some embodiments, the articulating member 44 preferably also comprises a processor such as a printed circuit board 160 operatively coupled to the encoder assembly 128. The printed circuit board 160 preferably can be used to process an electronic signal generated by the encoder assembly 128. In some embodiments, the printed circuit board 160 can be used to convert an analog signal generated by the encoder assembly 128 to a digital signal. The printed circuit board 160 can be operatively coupled to a processor or other computer via a wired or wireless link and can transmit the digital signal to the processor or computer. In the illustrated embodiment, the printed circuit board is desirably located proximally of the encoder hub 132 and is further supported by the bracket 162. In some embodiments, the bracket 162 can be also configured to support the slip ring assembly 126 and/or the read head 130 (see FIG. 3). The location of the printed circuit board 160, as illustrated in FIG. 4 can be particularly advantageous in that it provides a relatively out-of-the-way position for the printed circuit board such that the operation of the encoder assembly 128 and the slip ring assembly 126 are not impeded by the printed circuit board 160. Furthermore, in the illustrated embodiments, the printed circuit board 160 is housed within the cover 124, thus providing protection from bumping or contamination. In other embodiments, other positions for the printed circuit board 160 may also be employed, such as that illustrated in FIG. 5 described in greater detail below.

Figure 5:
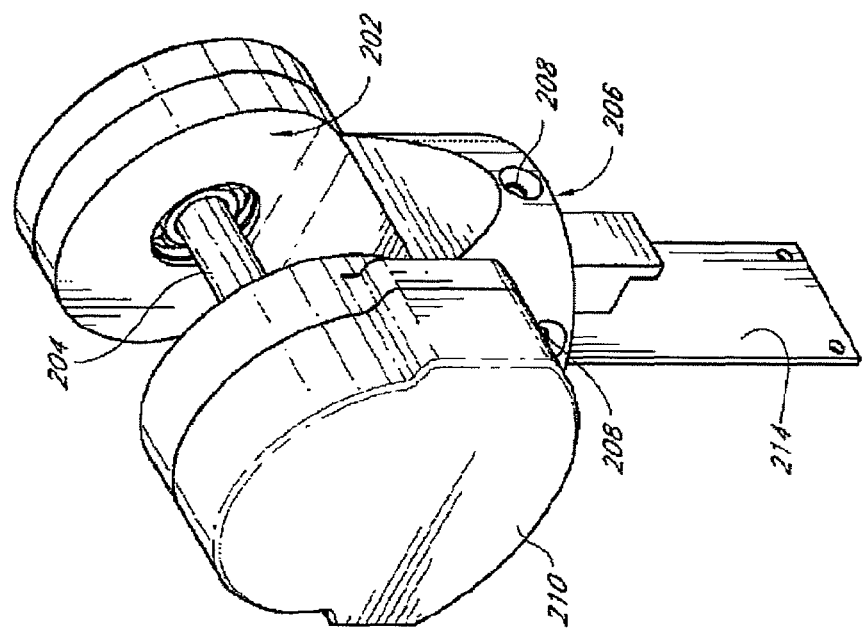
FIG. 5 is a perspective view of another articulating member of the coordinate measuring device of FIG. 1.

FIG. 5, illustrates the articulation member or hinge member 46 of FIG. 1 decoupled from the transfer member 26 and the transfer member 28. The articulation member 46 can comprise a housing yoke 202 supporting a shaft 204. In some embodiments of PCMM 10, the shaft 204 can be clamped by a mounting clamp associated with the articulating member 48, similar to the mounting clamp 142 of the articulating member 44 (FIG. 3). The housing yoke 202 can desirably support the shaft 204 at two locations so as to provide an exposed region of the shaft 202. This exposed region of the shaft 204 can be clamped by the mounting clamp 142. In the illustrated embodiments, the housing yoke 202 extends downwards to a mounting member 206 comprising mounting holes 208 As illustrated, the mounting holes 208 configured to mate with the holes 122 of the transfer member 26(see FIG. 2). In some embodiments, a cover 210 is attached to one external side of the housing yoke 202. The cover 210 is configured to house internal workings of the articulating member 46. In some embodiments, an encoder assembly is housed within the cover 210.

Figure 6:
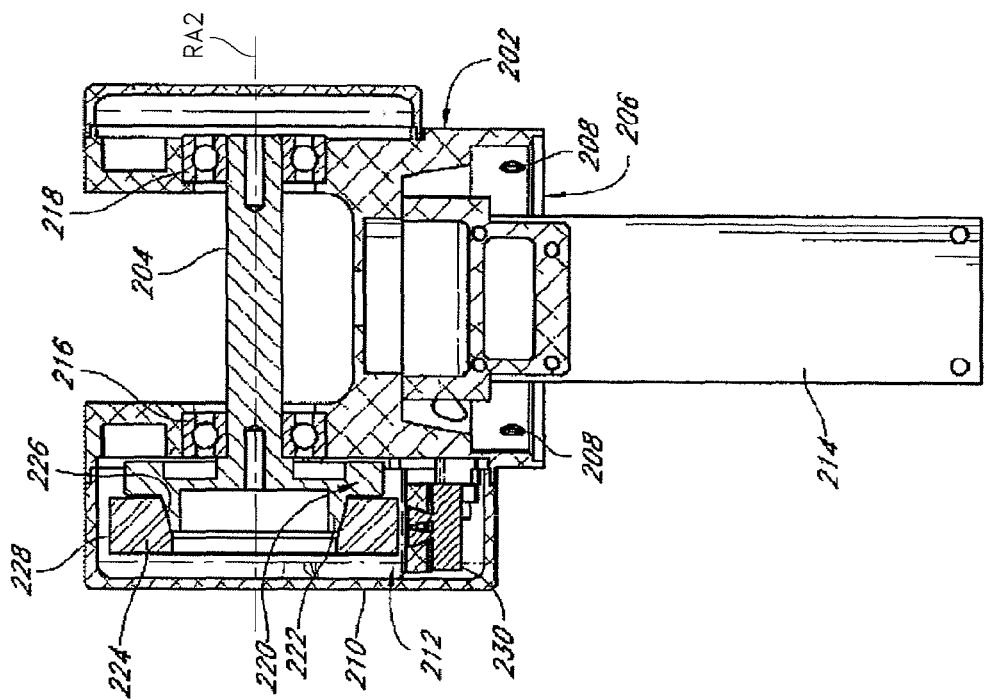
FIG. 6 is cross-sectional view of the articulating member of FIG. 5.

FIG. 6 is an illustration of a cross-sectional view of the articulating member 46 of FIG. 5. In some embodiments, the articulating member 46 comprises bearings 216, 218 which support opposing ends of the shaft 204 so as to provide a smooth rotational interface for the shaft 204 relative to the housing yoke 202. In some embodiments, the shaft 204 can include an encoder mount portion 220. In some embodiments, the mount portion 220 can be formed to a tapered mount portion 222 configured to receive an encoder hub 224. The encoder hub 224 can comprises a tapered recess 226 which is sized and shaped to closely receive the tapered mount portion 222 of the shaft 204.

Similar to the encoder assembly illustrated in FIG. 3 above with respect to a swiveling articulation member, the encoder assembly 212 illustrated in FIG. 6 comprises an encoder hub 224 and a read head 230. The encoder hub 224 can comprise a read surface 228 that is located on a radially outer surface thereof. Furthermore, the read head 230 can be mounted to the housing yoke 202. The read head can be configured to read optical demarcations on the read surface 228 of the encoder hub 224.

Once again, the arrangement of the encoder hub 224 and the read head 230 can be particularly advantageous in that the read surface 228 is located on the encoder hub 224 such that a relatively large number of optical demarcations can be placed on the encoder hub with relatively large spacing between adjacent demarcations. Thus, relatively fine resolution can be achieved by the encoder assembly 212. Furthermore, in some embodiments, the optical demarcations can be oriented such that they are substantially parallel to a rotation axis RA2 of the encoder assembly 212. Furthermore, similar to the encoder assembly 128 described above with respect to FIG. 3, the relative positioning of the encoder hub 224 and the read head 230 can orient the read direction of the optical encoder assembly 212 transversely to the rotational axis RA2 of the encoder assembly 212. In some embodiments, the read direction of the encoder assembly 212 can be substantially perpendicular to the rotation axis RA2.

With continued reference to FIG. 6, a printed circuit board 214 can extend below the mounting member 206. The printed circuit board 214 preferably can be used to process an electronic signal generated by the encoder assembly 212. In some embodiments, the printed circuit board 214 can be used to convert an analog signal generated by the encoder assembly 128 to a digital signal. The printed circuit board 214, like the printed circuit board 160, can be operatively coupled to a processor or other computer via a wired or wireless link and can transmit the digital signal to the processor or computer. One particular advantage of the location of the printed circuit board 214 is that when the articulating member 46 is assembled with the transfer member 26 (FIG. 1), the printed circuit board 214 will preferably extend within the transfer member 26. Thus, the transfer member 26 can provide a protective covering for the printed circuit board 214. This covering arrangement can be particularly advantageous in that the transfer member 26 achieves a dual purpose by acting as both a protective member and a structural member of the PCMM 10.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A coordinate measuring machine comprising:
a first transfer member;
a second transfer member; and
an articulating joint assembly rotatably coupling the first transfer member to the second transfer member and defining an axis of rotation, said articulating joint comprising:
a housing; and
a shaft rotatable relative to said housing; and
an encoder assembly comprising:
a read head coupled to one of said housing and said shaft; and
an encoder hub attached the other of said housing and said shaft, the encoder hub having a read surface;
wherein said encoder read head and the read surface of the encoder hub define a read direction of the encoder assembly, and wherein the read direction is transverse to the axis of rotation of the articulating joint.

2. The coordinate measuring machine of claim 1, wherein the encoder hub comprises a tapered mounting surface and the housing of the articulating joint comprises a tapered mounting surface.

3. The coordinate measuring machine of claim 1, wherein the encoder hub further comprises optical demarcations positioned on the read surface.

4. The coordinate measuring machine of claim 3, wherein the optical demarcations are substantially parallel to the rotational axis of the articulating joint.

5. The coordinate measuring machine of claim 3, wherein the optical demarcations comprise grating.

6. The coordinate measuring machine of claim 1, wherein the read direction of the encoder assembly is substantially perpendicular to the rotational axis of the articulating joint.

7. The coordinate measuring machine of claim 1, wherein the encoder hub has a generally cylindrical outer surface defining the read surface.

8. The coordinate measuring machine of claim 1, wherein the encoder assembly further comprises a processor operatively coupled to the read head.

9. The coordinate measuring machine of claim 8, wherein the processor comprises a printed circuit board.

10. The coordinate measuring machine of claim 9, wherein the printed circuit board is configured to digitize a signal generated by the encoder assembly.

11. The coordinate measuring machine of claim 9, wherein the printed circuit board is retained within one of the first transfer member and the second transfer member.

12. The coordinate measuring machine of claim 1, further comprising a second articulating joint assembly rotatably coupling the first transfer member to the second transfer member and defining a second axis of rotation such that the first transfer member is rotatably movable relative to the second transfer member about the second axis of rotation.

13. The coordinate measuring machine of claim 12, wherein the second articulating joint comprises:
a housing; and
a shaft rotatable relative to said housing; and
an encoder assembly comprising:
a read head rotationally coupled to one of said housing and said shaft; and
an encoder hub attached to the other of said housing and said shaft, the encoder hub having a read surface;
wherein said read head and the read surface of the encoder hub define a read direction of the encoder assembly, and wherein the read direction is transverse to the axis of rotation of the articulating joint.

14. The coordinate measuring machine of claim 13, wherein the encoder hub has a generally cylindrical outer surface defining the read surface.

15. The coordinate measuring machine of claim 13, wherein the read head is rotationally coupled to said housing and the encoder hub is attached to the shaft.

16. A coordinate measuring machine comprising:
a manually positionable articulated arm having opposed first and second ends, said arm including a plurality of arm segments connected together by joints, each joint rotating about a rotational axis,
a measurement probe attached to a first end of said articulated arm; and
a plurality of encoders, wherein at least one of said encoders comprises an encoder hub that rotates about the rotational axis of the joint and an encoder read head, the encoder hub including gratings that extend in a direction that is substantially parallel to the rotational axis of the articulating joint.

17. The coordinate measuring machine of claim 16, wherein the read direction of the encoder read head is substantially perpendicular to the rotational axis of the joint.

* * * * *